(12) United States Patent
Smith

(10) Patent No.: US 7,375,445 B1
(45) Date of Patent: May 20, 2008

(54) APPARATUS FOR MOVING THE EFFECT OF A WALL SWITCH FROM ITS SWITCHED POWER OUTLET TO A NON-SWITCHED OUTLET

(76) Inventor: Michael Gordon Smith, 4942 Marlon Dr., New Port Richey, FL (US) 34652

( * ) Notice: Subject to any disclaimer, the term of this patent is extended or adjusted under 35 U.S.C. 154(b) by 474 days.

(21) Appl. No.: 11/112,123

(22) Filed: Apr. 22, 2005

Related U.S. Application Data

(60) Provisional application No. 60/521,431, filed on Apr. 24, 2004.

(51) Int. Cl.
  *H01H 35/00* (2006.01)
(52) U.S. Cl. .................................. 307/116; 307/140
(58) Field of Classification Search ............... 307/116, 307/140
  See application file for complete search history.

(56) References Cited

U.S. PATENT DOCUMENTS 3,590,271 A * 6/1971 Peters ...................... 307/140
5,895,985 A * 4/1999 Fischer ..................... 307/116
5,905,442 A * 5/1999 Mosebrook et al. ......... 340/3.7
2003/0090362 A1* 5/2003 Hardwick .................. 340/5.1
2006/0104291 A1* 5/2006 Rodriguez et al. .......... 370/401
2006/0158040 A1* 7/2006 McIntosh .................. 307/114
2006/0290210 A1* 12/2006 Foard ...................... 307/147

* cited by examiner

*Primary Examiner*—Michael J Sherry
*Assistant Examiner*—Daniel Cavallari
(74) *Attorney, Agent, or Firm*—Edward P Dutkiewicz

(57) ABSTRACT

A controller that can move the effect of a wall switch from its associated a controller that can move the effect of a wall switch from its associated switched power outlet socket to any regular (always on) socket by use of a transmitter/receiver paired device located separately in the switched and non-switched power outlets respectively, thus moving the effect of the wall switch without any wiring modifications to the sockets. The invention may use infrared light, ultrasonics, or radio-frequency radiations, or modulations on the power supply within the building such as the X-10 system. The preferred (and prototyped) solution does not require replaceable batteries but instead uses capacitive power storage for use after power has been removed from the transmitter in order to send the "off" signal to the receiver. Both transmitter and receiver use a capacitive power supply.

3 Claims, 3 Drawing Sheets

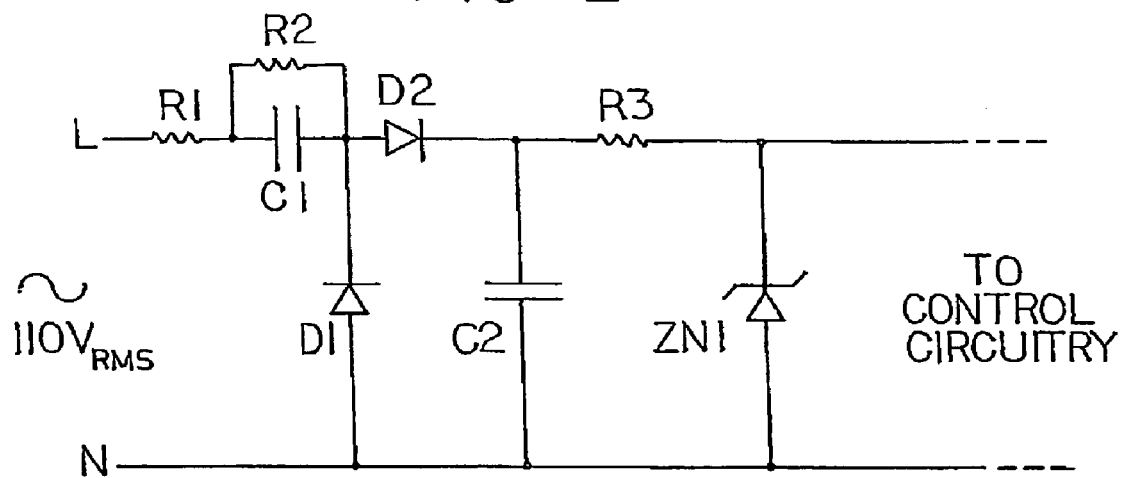
FIG 2 - PRIOR ART
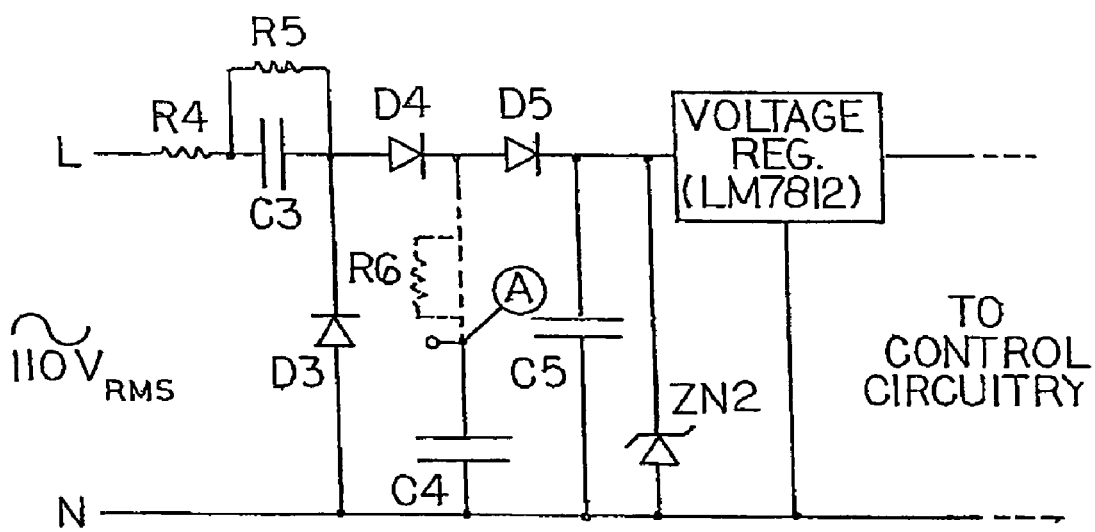
FIG 3

APPARATUS FOR MOVING THE EFFECT OF A WALL SWITCH FROM ITS SWITCHED POWER OUTLET TO A NON-SWITCHED OUTLET

RELATED APPLICATION

This application is based upon pending Provisional Application No. 60/521,431 filed Apr. 24, 2004, the subject matter of which is incorporated herein by reference.

BACKGROUND OF THE INVENTION

1. Field of the Invention

The present invention relates to an apparatus for moving the effect of a wall switch from its switched power outlet to a non-switched outlet and more particularly pertains to allowing a user to control a non-switched wall outlet with a switch. In this invention the control is plugged into existing wall electrical outlets and requires no construction or alteration of existing structures.

2. Description of the Prior Art

The use of remote control systems is known in the prior art. More specifically, remote control systems previously devised and utilized for the purpose of controlling systems from remote locations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,590,271 issued Jun. 29, 1971 to Peters relates to remote control system. U.S. Pat. No. 4,249,162 issued Feb. 3, 1981 relates to a remote control switch assembly. U.S. Pat. No. 5,898,384 issued Apr. 27, 1999 to Alt relates to programmable remote control systems for electrical apparatuses. U.S. Pat. No. 6,174,073 issued Jan. 16, 2001 to Regan relates to Radio frequency remote-controllable lighting system having a plurality of lighting units. U.S. Pat. No. 6,452,490 issued Sep. 17, 2002 to Garland relates to home/commercial security monitoring system. U.S. Pat. No. Re. 38,069 issued Apr. 8, 2003 to Posa relates to an electrical switched load relocation apparatus. Lastly, U.S. Published application Ser. No. 2002/0044042 published Apr. 18, 2002 in the name of Christensen relates to a RF home automation system comprising nodes with dual functionality.

While these devices fulfill their respective, particular objectives and requirements, the aforementioned patents do not describe an apparatus for moving the effect of a wall switch from its switched power outlet to a non-switched outlet.

In this respect, the apparatus for moving the effect of a wall switch from its switched power outlet to a non-switched outlet according to the preferred embodiment of the present invention substantially departs from the conventional concepts and designs of the prior art, and in doing so provides an apparatus primarily developed for the purpose of allowing a user to control a second outlet from a switch coupled to a first outlet.

Therefore, it can be appreciated that there exists a continuing need for a new and improved apparatus for moving the effect of a wall switch from its switched power outlet to a non-switched outlet. In this regard, the present invention substantially fulfills this need.

SUMMARY OF THE INVENTION

In view of the foregoing disadvantages inherent in the known types of remote control systems now present in the prior art, the present invention provides an improved apparatus for moving the effect of a wall switch from its switched power outlet to a non-switched outlet. As such, the general purpose of the present invention, which will be described subsequently in greater detail, is to provide the user with a way to control a wall outlet with a switch coupled to another outlet, and method of constructing the same, which has all the advantages of the prior art and none of the disadvantages.

To attain this, the present invention essentially comprises a controller that can move the effect of a wall switch from its associated switched power outlet socket to any regular (always on) socket by use of a transmitter/receiver paired device located separately in the switched and non-switched power outlets respectively, thus moving the effect of the wall switch without any wiring modifications to the sockets. The invention may use infrared light, ultrasonics, or radio-frequency radiations, or modulations on the power supply within the building such as the X-10 system. The preferred (and prototyped) solution does not require replaceable batteries but instead uses capacitive power storage for use after power has been removed from the transmitter in order to send the "off" signal to the receiver. Both transmitter and receiver use a common capacitive power supply.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus for moving the effect of a wall switch from its switched power outlet to a non-switched outlet which has all of the advantages of the prior art remote control systems and none of the disadvantages.

It is another object of the present invention to provide a new and improved apparatus for moving the effect of a wall switch from its switched power outlet to a non-switched outlet which may be easily and efficiently manufactured and marketed.

It is further object of the present invention to provide a new and improved apparatus for moving the effect of a wall switch from its switched power outlet to a non-switched outlet which is of durable and reliable constructions.

An even further object of the present invention is to provide a new and improved apparatus for moving the effect of a wall switch from its switched power outlet to a non-switched outlet which is susceptible of a low cost of manufacture with regard to both materials and labor, and which accordingly is then susceptible of low prices of sale to the consuming public, thereby making such apparatus economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred primary embodiment of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a typical capacitive power supply.

FIG. 3 is the modified power supply used by the transmitter.

The same reference numerals refer to the same parts throughout the various Figures.

DESCRIPTION OF THE PREFERRED EMBODIMENT

Figure 1:
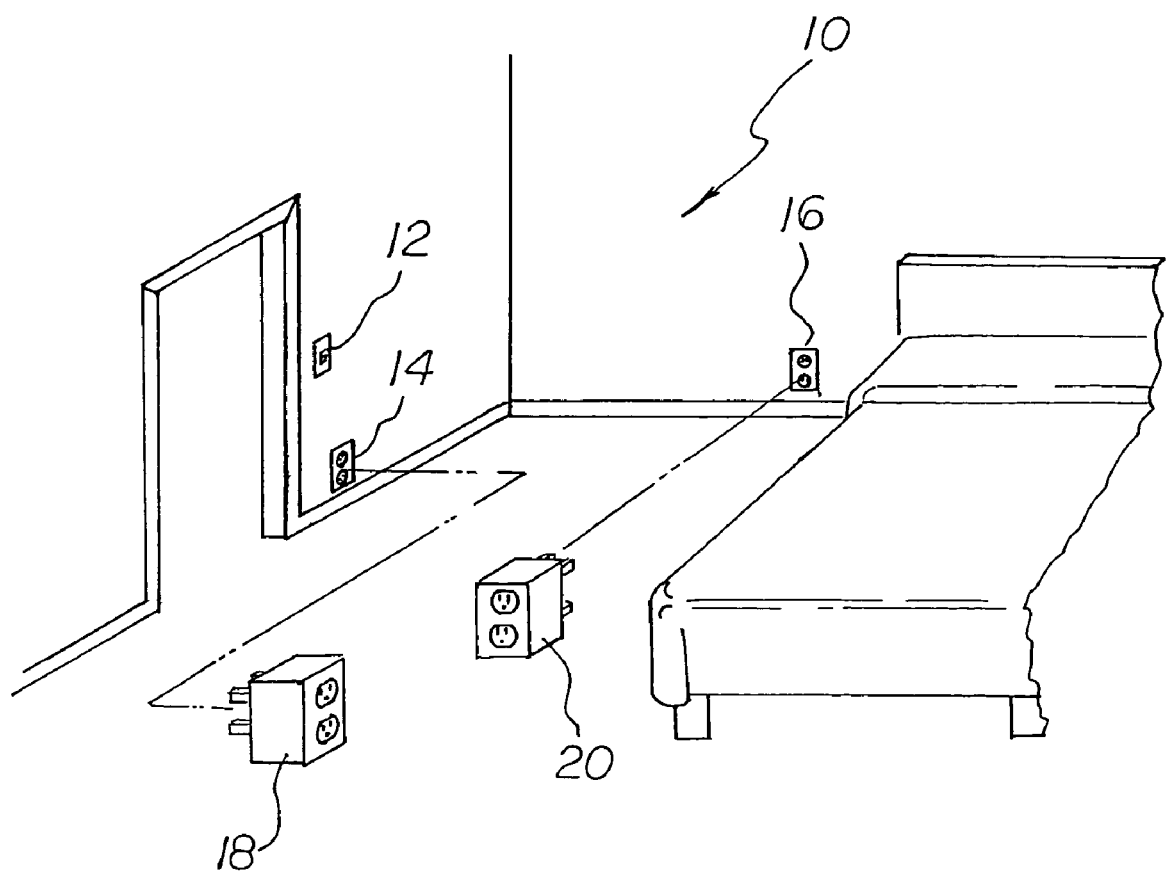
FIG. 1 is a perspective view of a typical room with a fixed wall switch, an outlet that is controlled from that wall switch, a regular non-switched outlet and then of apparatus for moving the switching effect of a wall switched power outlet to a preferred location of a non-switched power outlet.

With reference now to the drawings, and in particular to FIG. 1 thereof, the preferred embodiment of the new and improved apparatus for moving the effect of a wall switch from its switched power outlet to a non-switched outlet embodying the principles and concepts of the present invention and generally designated by the reference numeral 10 will be described.

The present invention, the apparatus for moving the effect of a wall switch from its switched power outlet to a non-switched outlet 16, is comprised of a plurality of components. Such components in their broadest context include a transmitter and a receiver. Such components are individually configured and correlated with respect to each other so as to attain the desired objective.

As may be seen in FIG. 1, first provided is an operator controlled wall switch 12. The wall switch is positioned in a room. The wall switch has a first electrical outlet 14. The first electrical outlet is located in the room at a first location. There is a second outlet 16. The second outlet is located in the room at a second location remote from the first electrical outlet and remote from the wall switch. The first electrical outlet is hardwired to the electrical switch. In this manner turning off the electrical switch will inactivate the first electrical outlet. Also in this manner turning on the electrical switch will activate the first electrical outlet. The second electrical outlet is activated at all times independent of the orientation of the first electrical switch.

Both transmitter and receiver may plug directly into their respective wall outlets requiring no further installation. Each is preferably a small box not much larger than a plug-in air freshener. The exact dimensions will depend, of course, on the circuitry and parts required for the preferred embodiment. The receiver includes an outlet socket for the driven appliance, a lamp in the example discussed above. For convenience, the transmitter preferably includes an outlet socket to directly "pass through" the switched wall socket power so that the wall socket can be used to directly drive an additional appliance. This will have no effect on the operation of the invention.

Three different forms of radiation could be used between the transmitter and receiver. These are ultrasonic, infrared light, and radio frequency, wireless transmissions. Each have pros and cons. An additional "wired" transmission method could be used. This is modulating a signal in the building wiring itself. This method of signal transmission is growing in popularity. A commonly used form of this is popularly known as "X-10". Devices used for control of various household appliances and security systems using the X-10 system of wired signal transmission are commercially available.

Another issue regarding the transmission method is whether a signal or radiation field should be constant during the "on" or "off" condition, or used merely as a momentary signal to turn the receiver output on or off. The former has the advantage of simpler control in that, once power has been removed from the switched outlet, the transmitter stops sending the constant field, and the receiver then turns off.

The two issues mentioned above are somewhat interdependent. It may not be practical, for example, to "bathe" a room in permanent infrared light, or light pulses, in an environment where other infrared-controlled devices such as TV's or VCR's are operating. The issue is not so much interference, since proper coding of pulses would avoid this. But, since the light output of the invention would have to be high in order to ensure reliable operation, other infrared appliances could be "blinded" by the continuous stream of infrared light pulses.

Using any form of controlling radiation, it would be more desirable to use a momentary signal for the switching rather than a constant "room-bathe" while in the on, or off, state. This would also greatly reduce power consumption of the transmitter. However, due to the unpowered nature of the switched outlet socket in the "off" state, the transmitter would not have power available at the moment it needs to send an "off" signal and would either have to rely on a battery to operate, or use a relatively large capacitor to store power momentarily in order to send an "off" signal to the receiver when power is turned off at the wall switch.

The inventor of the present invention has used the latter scheme in prototyping the invention. It uses a wireless, radio frequency method of transmission and reception, sending an "on" or "off" signal only at the chance of state of the switched power outlet. Radio frequency was chosen as the preferred embodiment at this time because it is less vulnerable to being blocked by furniture as would an infrared signal. Radio frequency transmissions are commonly used indoors in remote controls for gas fireplaces as well as outdoors for automatic garage doors. By storing power in a relatively large capacitor, the prototype circuit operates long enough to send an "off" signal when power is lost from the outlet socket into which it has been installed, without the need for a battery. The transmitter control circuit uses an encoder IC, such as a Holtek HT12F encoder, while the receiver uses its counterpart decoder IC, such as the Holtek HT12D decoder, to decode the transmission. By encoding the signal, several transmitters can be used in close proximity if desired without interfering with each other. Alternatively, several receivers set to receive the same encoding, could be used to drive multiple appliances such as lamps, so that the one switched power outlet could control all in unison.

Both transmitter and receiver use a capacitive mode of power supply, that is, the capacitor stores power that is dissipated when needed. These are very commonly used in small electronic devices that are plugged directly into wall power since they are cheap, light in weight, and generate virtually no heat. One drawback is that the control electronics are referenced directly to wall power neutral. However, this is not important in the present application as all the circuitry of a production version will be inside a protective plastic casing meeting the relevant safety minimums of insulation and track clearances for such authorities as Underwriter's Laboratories.

A typical capacitive power supply is shown in FIG. 2. C1 is the reactive component used to step down the AC input to a level suitable for the control circuitry. Its capacitance value is chosen to provide in excess of the maximum power requirement of the control circuitry bearing in mind that only half of the power available is used. D1 "dumps" all of the negative half cycles of power straight to ground, neutral. The positive half cycles are fed via D2 to smoothing and storage capacitor C2. All further ripple is dropped across R3, and ZN1 regulates voltage while also "sinking" any excess-to-requirements current to ground. R1 is a shock absorber to reduce current surges into the circuit at power up. R1 is merely there to quickly discharge C1 to prevent shock should someone remove the device from a powered socket and then touch the terminals.

One of the characteristics of such a power supply is that the supply capacitor C1 acts as a constant current source. Since the control circuitry that it powers may have varying current needs, any excess current not used by the control circuitry must be "sunk" to ground in order that a constant voltage be maintained. This is readily achieved by using the zener diode ZN1 across the power supply's output terminals. Once the zener voltage is achieved, any excess current that would otherwise cause the output voltage to build up is "sunk" to ground through the zener diode, thus maintaining the output voltage at the zener voltage.

The main challenge to this design for the invention described herein is to provide a source of power at the transmitter after power has been turned off at the socket in which it is plugged. While using a zener diode at the power supply's output terminals is a low-cost and simple way to regulate voltage in a constant current power supply, it has one big drawback when used to power the transmitter part of this invention. The transmitter is required to send an "off" signal to the receiver at a time after power is turned off to the transmitter. As mentioned above, it is intended not to use a battery in this application but to use the energy stored in a capacitor C2 to provide enough power to enable the control circuitry to send the "off" signal. This makes both transmitter and receiver maintenance-free. But the zener diode used to regulate the output voltage will quickly "sink" the charge stored in the capacitor C2 to ground until the voltage across the storage capacitor falls below the zener voltage. The remaining charge is no longer regulated and voltage spikes can be generated across the smoothing resistor R3 due to varying current demands which could cause stability problems within the control circuitry.

The challenge then is to have a zener diode work in unison with the constant current source to maintain constant voltage to power the control circuitry while the transmitter is powered from the wall socket and then, when power is lost, the zener diode "goes away" and the remaining charge on the storage capacitor is used frugally but is still regulated for voltage thus avoiding voltage spikes.

This is achieved by using both a zener diode and a voltage regulator. See FIG. 3. The zener diode ZN2 is now used directly across the storage capacitor C5 to limit the voltage across this capacitor. Any excess current from the constant current source capacitor is "sunk" directly to ground. The input to the voltage regulator is placed in parallel with the capacitor and zener diode. The zener voltage of the zener diode is chosen to be much greater than that of the output of the voltage regulator, twice the voltage, for example. This creates a large amount of charge at the storage capacitor for use once power is lost. The voltage regulator output voltage is as required by the control circuitry. The idea is that the storage capacitor is maintained at a voltage well in excess of the required voltage at the control circuitry while power is available at the wall socket into which the transmitter is plugged. The voltage regulator uses this higher input voltage and drops it to the correct voltage for the control circuitry. When power is removed (the wall switch is turned off) the voltage at the storage capacitor immediately falls below the zener voltage. No further charge is "sunk" to ground— basically wasted—by the zener diode. The remaining charge on the storage capacitor is used only as required by the control circuitry via the voltage regulator to send the "off" signal before all charge is lost and the transmitter is without power.

Figure 4:
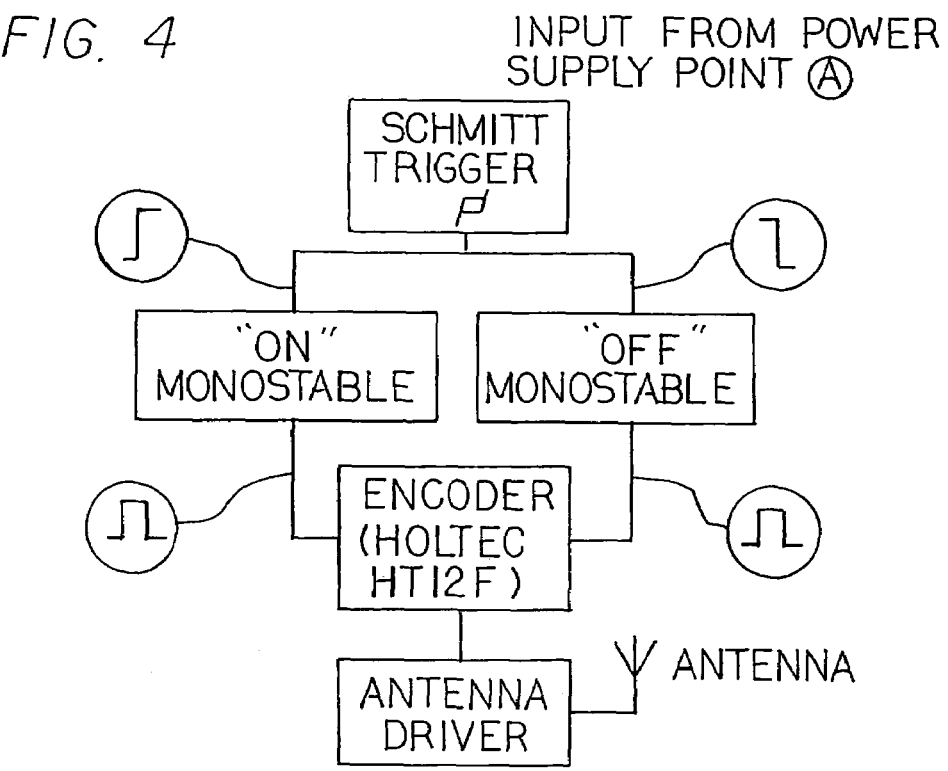
FIG. 4 is the transmitter logic.

Referring back to FIG. 3, point A is used to provide the control circuitry with a reference to power availability. Point A climbs at the same rate as the storage capacitor but can be "slugged" by putting a resistor R6 in series with it. This small delay allows the storage capacitor to fully charge and power the control circuitry before the latter "sees" power-on. Point A is fed into a Schmitt trigger to "square off" and clean up the input and also provide hysteresis for the rest of the control circuitry. See FIG. 4. This hysteresis makes sure that the power supply and control circuitry have fully charged before sending an "on" signal to the receiver, by waiting for point A to climb higher for an "on" state than an "off" state. This will avoid spurious "on" signals being generated by sloppy operation of the wall switch when there has not been enough time to generate sufficient charge at the storage capacitor to ensure an "off" signal also. This greatly reduces the possibility of the receiver getting out of synch with the wall switch.

The output of the Schmitt trigger is fed into two separate monostable oscillators; one for "on" and one for "off". Each uses the clean, sharp-edged output of the Schmitt trigger to generate square one-off pulses to transmit to the receiver via the Holtek HT12F encoder. The "on" monostable uses the rising edge output of the Schmitt trigger to generate its pulse while the "off" monostable uses the falling edge. Each pulse is then sent to the Holtek encoder circuit which in turn generates either an "on" or an "off" signal to the receiver.

Figure 5:
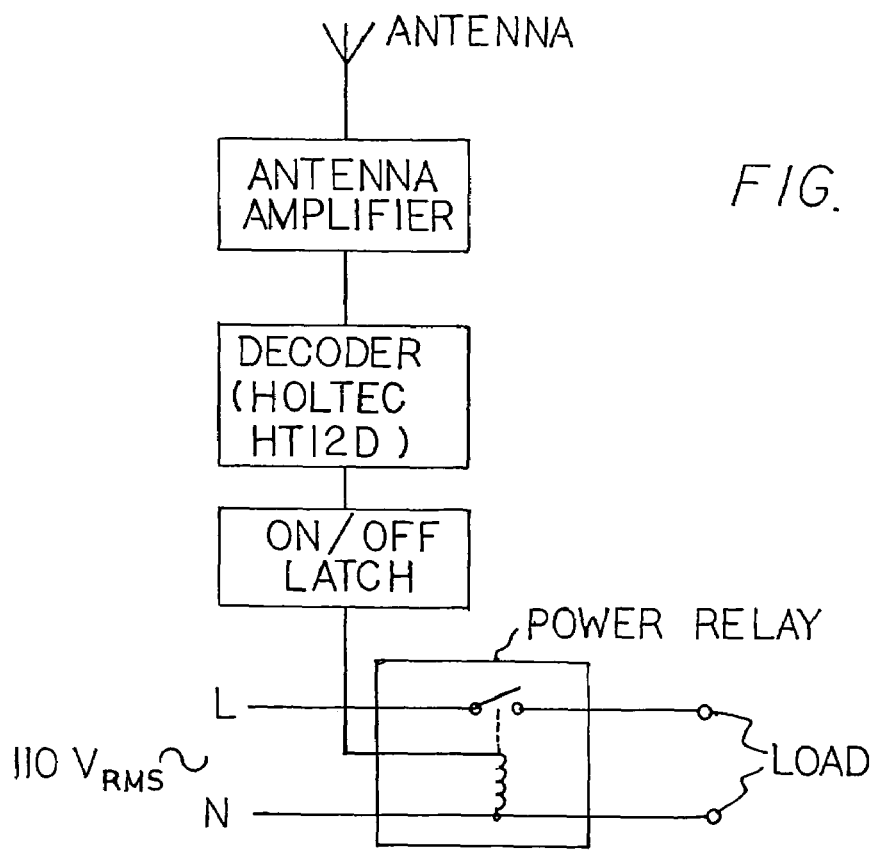
FIG. 5 is the receiver logic.

The receiver is very straightforward in design. See FIG. 5. It receives transmissions via a simple built-in antenna and amplifier section and decodes them using the Holtek counterpart decoder (HT12D) to the transmitter's encoder. Each of these chips is set to send/receive the same encoding. The "on" or "off" signals are used to turn a latch on or off which is used in turn to control the power relay that provides wall power to the required appliance. The receiver uses a similar capacitive means of storing power to that of the transmitter, with the exception of the need for a "point A" or both zener diode and voltage regulator, i.e., it uses a power supply as described in FIG. 2.

From the above, it may be appreciated that the present invention is a controller that can move the effect of a wall switch from its associated switched power outlet socket to any regular, always on, socket by use of a transmitter/receiver paired device located separately in the switched and non-switched power outlet respectively, thus moving the effect of the wall switch without any wiring modifications to the sockets. The invention may use infrared light, ultrasonics, or radio-frequency radiations, or modulations on the power supply within the building such as the X-10 system. The preferred, or prototyped, solutions does not require replaceable batteries but instead uses capacitive power storage for use after power has been removed from the transmitter in order to send the "off" signal to the receiver. Both transmitter and receiver use a common power supply.

The present invention also includes a method for moving the switching effect of a wall switch-controlled power outlet to a preferred location of a non-switched power outlet, without the need to trail extension cords from the switched outlet, or the need and expense of rewiring the outlets permanently.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Apparatus for moving the effect of a wall switch from a switched first power outlet to a non-switched second power outlet comprising:
   a receiver having a capacitive circuit power supply being electrically coupleable to a non-switched second outlet;
   a transmitter having a capacitive circuit power supply being electrically coupleable to a switched first outlet;
   a transmitter control circuit with a first antenna coupleable to the switched first outlet;
   a receiver control circuit with a second antenna coupleable to the non-switched second outlet; and the power supply having a parallel power (L) and neutral (N) lines adapted to couple a 110 volt rms to the transmitter, the lines having an input circuit including at least one diode and at least one capacitor and at least one resistor, the circuit having a power supply point with a resistor and a capacitor and a zener diode in parallel, the power (L) line also having a resistor coupled with a resistor and a capacitor in parallel in advance of a diode, the power (L) line also having a diode between a diode and a capacitor, the power (L) line also including a diode between a capacitor and a zener diode, the also including (L) line also having an associated voltage regulator coupled thereto, the regulator following a zener diode.

2. Apparatus for moving the effect of a wall switch from a switched first power outlet to a non-switched second sower outlet comprising:
   a receiver having a capacitive circuit power supply being electrically coupleable to a non-switched second outlet;
   a transmitter having a capacitive circuit power supply being electrically coupleable to a switched first outlet;
   a transmitter control circuit with a first antenna coupleable to the switched first outlet;
   a receiver control circuit with a second antenna coupleable to the non-switched second outlet;
   the receiver having an internal circuitry that is electrically coupled to the second outlet of the power supply, the receiver having parallel power (L) and neutral (N) lines configured to couple a 110 volt rms to the receiver circuitry, the lines having an associated input circuit having at least two diodes and at least two capacitors and at least one zener diode, with a diode and a capacitor and a zener diode being oriented in parallel, the input circuit also including in the power (L) line having an associated resistor followed by a resistor and a capacitor in parallel being in advance of a diode, with a diode being in the power (L) line and located between a diode and a capacitor, the power (L) line also having a resistor between a capacitor and the zener diode; and the transmitter control circuit further includes a Schmitt trigger coupled with a parallel "on" monostable oscillator and "off" monostable oscillator, and next coupled with an encoder, with the circuit having an associated antenna driver with a first antenna coupled thereto.

3. Apparatus for moving the effect of a wall switch from its switched power outlet to a non-switched outlet to increase the convenience for a person using electrical switches and outlets in a safe and convenient manner comprising, in combination:
   an operator controlled wall switch positioned in a room with a first electrical outlet located in the room at a first location and a second outlet located in the room at a second location remote from the first electrical outlet and remote from the wall switch, the first electrical outlet being hardwired to the electrical switch whereby turning off the electrical switch will inactivate the first electrical outlet and turning on the electrical switch will activate the first electrical outlet, the second electrical outlet being activated at all times independent of the orientation of the orientation of the first electrical switch;
   a receiver device having a capacitive power supply being electrically coupled to the second outlet, the receiver power supply having a parallel power (L) and neutral (N) lines adapted to couple source of potential to a receiver control circuitry, the lines having an input circuit including a first diode (D1) and a second capacitor (C2) and first a zener diode (ZN1) in parallel, the input circuit also including in the power (L) line a first resistor (R1) followed by a second resistor (R2) and a first capacitor (C1) in parallel and in advance of the first Diode (D1), the input circuit also including in the power (L) line a second diode (D2) between the first Diode (D1) and the second capacitor (C2), the input circuit also including in the power (L) line a third resistor (R3) between the second capacitor (C2) and the first zener diode (ZN1);

a transmitter device having a capacitive transmitter power supply being electrically coupled to the first outlet, the transmitter power supply having a parallel power (L) and neutral (N) lines adapted to couple a source of potential to a transmitter control circuitry, the lines having an input circuit including a third diode (D3) and a capacitor forth (C4) with a series power supply point and an associated sixth resistor (R6), the circuit also including a fifth capacitor (C5) and a zener diode (ZN2) in parallel, the input circuit also including in the power (L) line a forth resistor (R4) followed by a fifth resistor (R5) and a third capacitor (C3) in parallel in advance of the third Diode (D3), the input circuit also including in the power (L) line a forth diode (D4) between the third Diode (D3) and the forth capacitor (C4), the input circuit also including in the power (L) line a fifth diode (D5) between the forth capacitor (C4) and the second zener diode (ZN2), the input circuit also including a voltage regulator in the power (L) line following the second zener diode (ZN2), with the regulator being coupled to the neutral (N) line;

a transmitter control circuit in the transmitter device and including an input point from the capacitive power supply, the input point being coupled with a Schmitt trigger and next coupled with parallel "on" monostable oscillator and "off" monostable oscillator, next coupled with an encoder, and finally coupled with an antenna driver with a first antenna built-in to a supporting first circuit board; and a receiver control circuit in the receiver device and including a second antenna built-in to a supporting second circuit board coupled with an antenna amplifier next coupled with a decoder, and then next coupled with an on and off monostable oscillator latch and finally coupled with a power relay, the power relay having input parallel power (L) and neutral (N) lines configured to couple a source of potential to a load at the second outlet.

* * * * *